Patented Oct. 7, 1958

2,855,417

ORGANOTIN COMPOUNDS AND PROCESS OF PREPARATION

Elliott L. Weinberg, Long Island City, N. Y., assignor to Metal & Thermit Corporation, New York, N. Y., a corporation of New Jersey No Drawing. Application December 3, 1952
Serial No. 323,935

18 Claims. (Cl. 260—429.7)

The present invention relates to the preparation of a six-fold coordinate organostannate derivative useful as a heat and light stabilizer for chlorinated materials such as vinyl chloride resins and the like and to stabilized compositions of matter containing said organostannate products. The products of this invention, furthermore, are six-fold coordinate organostannate derivatives containing both Sn—O and Sn—S bonds.

Many organotin compounds have heretofore been proposed as stabilizers for chlorine-containing resins. For the most part, these have been organotin salts of organic carboxylic acids in which the tin has been in the cation of the compound. Such compounds usually yield with the chlorine-containing resins, transparent, nearly water-white plastics with a considerable degree of resistance to discoloration by heat and/or light. They are, however, subject to spewing if used in too high a concentration and even sometimes at concentrations necessary to obtain adequate stabilization to heat and/or light. Several of these compounds have a tendency to cause sticking of a plastic formulation to the mill and calender rolls during processing.

Consequently in a copending application, Serial No. 232,878 there are disclosed a group of sulfur-containing compounds described as organotin derivatives of mercapto-acids and mercapto-acid esters, which possess exceptional ability to stabilize chlorine-containing plastics against the deleterious effect of heat and light. These compounds have the added advantage over prior art organotin stabilizers in that they do not spew even at concentrations far above those necessary for stabilization and do not cause mill or calender sticking. In the commercial application of these stabilizers, however, certain serious problems have been encountered, namely:

(a) When used with certain commercial polyvinyl-chloride resins containing trace quantities of lead, there are produced plastics which are gray and translucent instead of water white and transparent. While these plastics are highly stable to heat and light, their gray color makes them unacceptable for some uses.

(b) When a plastic sheet containing one of these stabilizers is held in intimate contact with another plastic sheet containing a lead stabilizer for some time, the latter sheet develops a dark stain. Since lead stabilizers are widely used in the vinyl plastic industry the necessary segregation of the two types of plastic sheets may be difficult and costly.

In the above copending application the organotin sulfur compound is in such a form that the organotin portion of the compound may be considered as a cationic residue. Accordingly, we have found a new group of sulfur-containing organotin products which are extremely effective heat and light stabilizers for chlorine-containing plastics and resins, and they do not cause graying when formulated with resins containing lead as impurity. Plastic compositions containing even somewhat excessive quantities of these sulfur-containing organotin products do not spew and have a much lower tendency to stain lead containing plastics than do plastics containing organotin sulfur-containing stabilizers of the type described in the copending application No. 232,878.

The unique character of our new group of sulfur-containing organotin products is dependent upon at least a portion of the organotin or all of the organotin being present in the compound as a six-fold coordinate organostannate anion. The new group of compounds may also involve the partial polymerization of more than one organostannate group to form di- or tri-organostannates. In laboratory preparation it is frequently possible to so control the action that only one unique product is the principal result of the reaction, but in commercial preparation certain materials may be obtained which are quite evidently mixtures of several of the possible products of the group. In the stabilization of chlorine-containing compositions such mixtures are entirely suitable. The physical properties and characteristics of the organostannate products are dependent upon the type and ratio of the reactants used to produce the products. The products in themselves may be solids, viscous semi-solids or liquids.

In accordance with this present invention the group of sulfur-containing organostannate stabilizers is the reaction product of an alcohol or alcohols, a dibasic acid, a bifunctional tin oxide and a mercaptoacid ester.

The alcohol reactant may be a substituted or unsubstituted, saturated or unsaturated aliphatic or aromatic hydroxyl compound such as isooctyl alcohol, dihydroabietyl alcohol, octadecyl alcohol, lauryl alcohol, phenol, etc. The dibasic acid may be a saturated or unsaturated dicarboxy compound such as maleic, itaconic, phthalic, succinic, adipic acids or anhydrides, etc. In this patent the term "dibasic acid" means either the acid per se or the anhydride of the dibasic acid. The bifunctional tin oxide may be selected from di-alkyl, diaryl or aralkyl tin oxides such as dibutyl, dimethyl, diphenyl, dibenzyl tin oxides, etc. The mercaptoacid ester reactant may be an α or β mercaptoalkyl acid ester, such as isooctyl mercaptoacetate, isooctyl β-mercapto-propionate, di-2-butyl octyl thiomalate, phenoxyethyl β-mercapto-propionate, etc.

Various procedures may be followed in preparing the sulfur-containing organotin compounds of this invention. However, we prefer to carry out the following reactions in the order given:

A. React the alcohol with the dibasic acid.
B. React the product of A with an organotin oxide.
C. React the product of B with a mercapto acid ester.

A is carried out by mixing the ingredients and heating until the mass becomes clear. If more than one mole of acid per mole of alcohol is used the mass may have two layers but each will be clear. The temperature in this step is not critical but is usually kept within the range 80–130° C.

In carrying out reaction B the organotin oxide is gradually added to the clear, hot product of A. The reaction is exothermic and the temperature of the mixture rises initially without the application of external heat. After all the organotin oxide has been added it may be necessary to raise the temperature by supplying external heat in order to complete the reaction. The reaction is judged to be complete when the mass again becomes substantially clear. Preferably, the temperature is raised no higher than is necessary to effect this clarification. Usually a temperature of about 135° C. suffices.

Before reaction C is carried out the clear product from

B is cooled to about room temperature, say to the range 25–50° C. and preferably near the lower end of this range. Then the mercaptoacid ester is added to it. Reaction starts immediately and proceeds rapidly with evolution of heat. The reaction is judged to be complete when heat evolution ceases. The product of reaction C is the sulfur-containing organotin compound of my invention. The reason for cooling the product of reaction B before proceeding with reaction C is that we have found that the staining properties of the products are dependent upon the temperature at which reaction C is carried out, the best products being made at low temperatures. There is of course a tendency for the temperature to rise during reaction C due to the heat of reaction. In small batches the natural cooling of the reaction vessel usually suffices to keep the temperature from rising too high, but in large batches it may be advisable to remove the heat of reaction by cooling coils or water jackets.

The final reaction is slightly exothermic. It is preferably carried out at about room temperature. The resultant product is a good stabilizer which is non-graying, non-spewing and non-sticking. However, plastic sheets containing it show a tendency to stain lead-stabilized plastic sheets when the two types of sheets are held in intimate contact contrary to the products made by the preferred technique.

Still another method of obtaining these organotin reaction products comprises reacting an alcohol with a dibasic acid as in the first step of the preferred procedure, adding to said liquid a mercaptoacid ester, subsequently adding a bifunctional organotin oxide to said solution whereby heat is generated, raising the temperature of the mixture to about 110–150° C. and preferably 135° C. using external heat if necessary, and recovering said organotin reaction products. Material made in this way is not free of the staining property.

The relative quantities of reactants utilizable in the obtention of the present reaction products may be varied over a wide range. It is essential, however, that certain broad limits be maintained to retain the advantages of the products of the present invention. The simplest form of product obtained has a generalized structure of the following type.

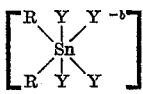

where $R$=alkyl, aryl or aralkyl, $Y$=coordination groups, coordinated thru O or S and $b$ is a varying charge dependent upon the nature of the Y's.

It should be noted that the tin atom in the above structure is in an electronic condition analogous to that of the stannate ion.

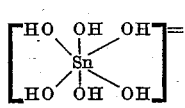

The stannate structure is modified by containing organic groups according to the theory postulated by Werner in which the hydroxo groups in the above stannate ion have been replaced by alkyl, aryl or aralkyl groups, by saturated alkyl thiolo (RS) groups, carboxylate groups and carboxyl groups. The resulting organostannate ion has a residual ionic charge which may be satisfied by the presence of proton groups or simple positively charged bi-functional organotin ions. As an example of the type of structure which is produced in the present invention, the simplest product possible by the co-reaction of iso-octyl alcohol, maleic anhydride, dibutyl tin oxide and isooctyl mercaptoacetate would be either

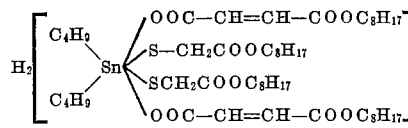

or

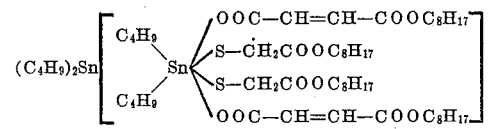

depending upon the amount of dibutyl tin oxide used in the reaction. That these products were not simple salts was proved by varying the amount of isooctyl mercaptoacetate used in the preparation. As long as the amount of isooctyl mercaptoacetate used was stoichiometrically less than the amount required by the above required formulations, it was found that it was impossible to remove any of the isooctyl mercaptoacetate by vacuum distillation. When the amount of isooctyl mercaptoacetate added was 10% in excess of that required by the above formulations, the excess over the stoichiometrically required amount was recovered by vacuum distillation from the product.

In general terms the anions of the simplest members of the group of compounds claimed in this invention may have generalized structures as follows:

$R$=alkyl, aryl, aralkyl
$D$=dibasic acid residue
$Q$=mercaptoacid residue
$T$=alcohol residue

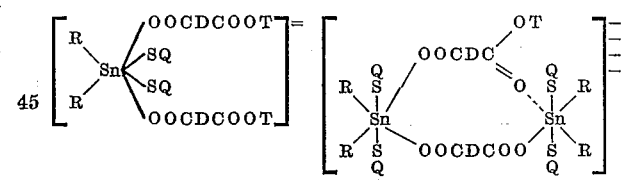

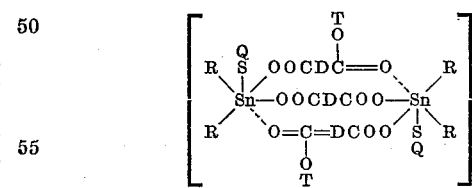

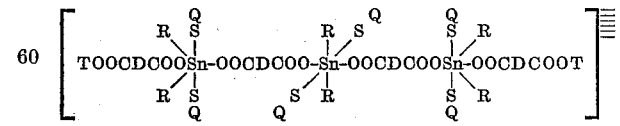

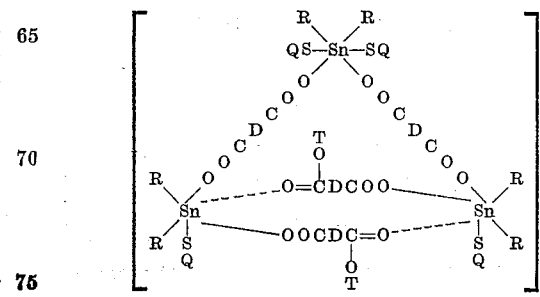

It can be readily recognized that the possible formulations of the tri stannate ions may be further extended by cross-linking of the adducts in many varied combinations. While we believe these above structures to fairly represent the anionic nature of the invention, we are not limited to the specific structure cited.

The organo stannate ions represented above may be electrically satisfied by the presence in the product of protons or of sufficient organotin cations to form neutral complexes.

The proportions of reactants need not be chosen so as to be stoichiometric for any particular one of the types since mixtures containing any of them are effective stabilizers. However, in order to realize the advantages of the products of this invention over prior art stabilizers, it is necessary that the relative proportions of the reactants meet the following criteria, wherein A defines the moles of alcohol, B defines the moles of dibasic acid, C defines the moles of organotin oxide and D defines the moles of mercaptoacid ester:

$\frac{A}{B}$ should be within the range of $\frac{1}{2}$ to 1

$\frac{D}{B}$ should be within the range of 0.2 to 2, and

C should have a value between $\frac{2B-A+D}{2}$ to $\frac{2B-A}{2}$

One preferred product has equimolecular quantities of alcohol, dibasic acid, organotin oxide and mercaptoacid ester. Another preferred product has the following molecular ratios:

$\frac{A}{B}=\frac{1}{2}$, $C=\frac{2B-A}{2}$, and $\frac{D}{B}$=about 0.9

Still another preferred product may have the following molecular ratios:

$\frac{A}{B}=\frac{2}{3}$, $C=\frac{2B-A}{2}$, and $\frac{D}{B}$=about 0.7

The following examples are further illustrative of these six-fold coordination compounds of di-organotin oxides and their preparation, and it will be understood that the invention is not limited thereto: The anhydride has been used in lieu of the acid because of ease of operation therewith.

EXAMPLE I 26.94 gms. isooctyl alcohol and 29.4 gms. maleic anhydride were placed in a 250 ml. beaker. Heat was applied until the maleic anhydride was melted and the mixture was agitated. 58.6 gms. dibutyltin oxide was added gradually to the liquid mix. The oxide dissolved in said liquid with the initial evolution of heat. After all the oxide was added, the temperature was raised to 135° C. At this temperature, the mixture was filtered yielding a clear yellow liquid. This liquid was cooled to 25–30° C. and mixed with 14.5 gms. isooctyl mercaptoacetate. Slight heating was noted, yielding a translucent solution which clarified upon filtration. The resultant material contained 19.25% Sn.

EXAMPLE II 52.09 gms. isooctyl alcohol, 39.22 gms. maleic anhydride and 92.5 gms. of 97% dibutyl tin oxide were treated as in Example I. To 100 gms. of this product was added 36.7 gms. isooctyl mercaptoacetate. A turbid solution resulted which cleared on filtration, analysing 18.0% Sn and 3.9% S(SH).

EXAMPLE III 52.09 gms. isooctyl alcohol, 58.8 gms. maleic anhydride and 138.9 gms. of 97% dibutyl tin oxide were treated as in Example I. To 100 gms. of this product, 23.9 gms. isooctyl mercaptoacetate were added, yielding a product analysing 21.6% Sn and 2.8% S(SH).

EXAMPLE IV 52.09 gms. isooctyl alcohol, 58.8 gms. maleic anhydride and 116.1 gms. of 97% dibutyl tin oxide were treated in accordance with Example I. 9.9 gms. isooctyl mercaptoacetate was added to 100 gms. of above material, yielding a product having the following analysis: 27.3% Sn; 1.35% S(SH).

EXAMPLE V 26.04 gms. isooctyl alcohol, 39.22 gms. maleic anhydride and 86.7 gms. of 97% dibutyl tin oxide were treated in accordance with Example IV. 9.9 gms. isooctyl mercaptoacetate was added to 100 gms. of above material. The final product had the following analysis: 24.9% Sn; 1.40% S(SH).

EXAMPLE VI 52.09 gms. isooctyl alcohol, 39.22 gms. maleic anhydride and 92.5 gms. of 97% dibutyl tin oxide were treated as in Example I. To 100 gms. of this product was added 89 gms. di-2-butyl octyl thiomalate. A turbid solution resulted which cleared on filtration.

EXAMPLE VII 26.0 gms. isooctyl alcohol, 19.6 gms. maleic anhydride and 31 gms. dimethyl tin oxide are treated in accordance with Example I. 40 gms. of above mixture was admixed with 17.7 gms. isooctyl mercaptoacetate to yield a liquid product.

EXAMPLE VIII 52.1 gms. isooctyl alcohol, 39.2 gms. maleic anhydride and 164.8 gms. dibutyl tin oxide were treated in accordance with Example I. 50 gms. of this material was mixed with 35.8 gms. isooctyl mercaptoacetate to yield a liquid product.

EXAMPLE IX

Maleic anhydride (0.2 mole), isooctyl alcohol (0.2 mole) were put in a beaker. The maleic anhydride was melted and agitation was started. The temperature rose to 80° C. and the mixture became one phase. (This represented the formation of monoisooctyl maleate.) To this fluid was added isooctyl mercaptoacetate (0.2 mole). Dibutyl tin oxide (0.2 mole) was then added gradually to the stirred solution. Additional heat was generated. After all the oxide had been added, the temperature was raised to 135° C. The material was then filtered. The product was a clear, slightly yellow viscous liquid.

EXAMPLE X

Itaconic anhydride (0.4 mole), isooctyl alcohol (0.4 mole) were mixed and heated to 140° C. Dibutyl tin oxide (0.4 mole) was gradually added while maintaining the temperature between 80–110° C. After completing the addition, the temperature was raised to 135° C. To 100 gms. of this cold material (20° C.) was added 41.6 gms. of isooctyl mercaptoacetate. The resulting product was amber on transmission and purple on reflectance.

EXAMPLE XI

Maleic anhydride (0.4 mole), isooctyl alcohol (0.4 mole) and dibutyltin oxide (0.4 mole) were treated in accordance with Example X. To 100 gms. of this material was added 47.4 gms. of phenoxyethyl β-mercaptopropionate. The resultant product was a clear, yellow viscous liquid.

EXAMPLE XII

Maleic anhydride (0.4 mole) isooctyl alcohol (0.4 mole) and diphenyl tin oxide (0.4 mole) were treated in accordance with Example X. To 100 gms. of this material, was added 39.5 gms. isooctyl mercaptoacetate. The final product is a yellow, viscous liquid.

EXAMPLE XIII

Phthalic anhydride (0.4 mole) and isooctyl alcohol (0.4 mole) were treated to about 113° C. until the anhydride melted and a clear solution was obtained. The heat was turned off and dibutyl tin oxide (0.4 mole) was added. After all the oxide had been added, the temperature was raised to 130° C. The material was allowed to cool to room temperature and iso-octyl mercaptoacetate (0.4 mole) was added. Heat was generated and a cloudy liquid formed. Upon filtration it clarified to a substantially colorless liquid.

EXAMPLE XIV

Succinic anhydride (0.4 mole) and isooctyl alcohol (0.4 mole) were heated to about 115° C. until a clear solution resulted. Dibutyl tin oxide (0.4 mole) was added, then the temperature was raised to 137° C. This material was cooled to 40° C. whereupon isooctyl mercaptoacetate (0.4 mole) was added. Heat was generated and a cloudy liquid formed. Upon cooling, it was filtered and a clear, colorless liquid resulted.

EXAMPLE XV

Adipic anhydride (0.4 mole) and isooctyl alcohol (0.4 mole) were heated to about 90° C. until a clear solution resulted. Dibutyltin oxide (0.4 mole) was added and the heat was raised to about 135° C. The product was cooled to room temperature and isooctyl mercaptoacetate (0.4 mole) was added. Heat was generated and a cloudy liquid was formed. Upon cooling, it was filtered to yield a clear, substantially colorless liquid.

EXAMPLE XVI

Isooctyl alcohol, maleic anhydride and dibutyltin oxide in the relative molar proportions of 2:2:1 were reacted by the procedure of Example I. 17.7 gms. of this compound and 10 gms. of isooctyl mercaptoacetate were mixed at room temperature. Heat was evolved. The reaction product was slightly cloudy and was filtered to yield as a final product a clear liquid.

EXAMPLE XVII

Isooctyl alcohol, maleic anhydride and dibutyltin oxide in the relative molar proportions 2:4:3 were reacted by the procedure of Example I and the product was cooled to room temperature. In a series of tests this product was reacted with varying quantities of isooctyl mercaptoacetate, the weight ratios of isooctyl mercaptoacetate to the aforesaid product lying between 1:9 to 1:1. The final products were all liquids. Two of the final products, namely those in which the ratios were 1:1.9 and 1:1 respectively, were subjected to concurrent heating and vacuum in an attempt to distill out any unreacted isooctyl mercaptoacetate. A small amount of the mercaptoester distilled out of the 1:1 final product but none from the 1:1.9 final product. We regard this as confirmatory evidence for our theory of a six-fold coordination structure. The 1:1 final product has 2.28 moles of isooctyl mercaptoacetate per gram atom of tin which is in excess of the 2 moles which could be held in such a structure. We believe it was this excess which distilled off.

These organotin reaction products will function as stabilizers for compositions containing chlorinated materials, particularly vinyl chloride containing resin compositions such as vinyl chloride polymer and copolymer resins containing plasticizers, and when intimately dispersed therein, will provide plastic compositions of improved resistance to heat and light deterioration. Films are obtained from the aforesaid plastic compositions which exhibit a high degree of stability. The optimum concentration of the aforesaid organotin derivatives, useful as a stabilizer is about 1% based on the weight of the chlorinated material, although ½–10% may also be utilized. The chlorinated composition containing this concentration of stabilizer produces a stable plastic film, which does not darken at elevated temperatures as evidenced by the following results.

In order to test the behavior of the stabilizers of this invention in polyvinyl chloride plastics, the product of each of the examples given above was used to make up a plastic composition containing:

100 parts of a commercial polyvinyl chloride, resin, known to contain about 7 parts per million of lead
50 parts of di-2-ethylhexyl phthalate (plasticizer)
3 parts of stabilizer.

The ingredients were mixed, then milled at 320° F. on a differential speed, 2-roll mill for 5 minutes after which the plastic composition was taken off the mill as a sheet about 40 mils thick. 1" x 6" strips were cut from this sheet and subjected to aging in a circulating air oven at 350° F. Excellent heat stability of the sheets was found in each instance. In no case was the sheet found to be gray whether examined directly after milling or after heat aging. Other samples of the 40 mil sheets were exposed to aging in sunlight for about one month. No sweating or spewing was observed in any case.

Other tests were made using other commercial polyvinyl chloride homo- and co-polymer resins in place of the lead-containing resin described above. In each instance the resulting plastic sheets were found to be highly stable to heat.

The products of most of the examples were also tested in compositions containing lower concentrations of stabilizer. In each case 100 parts of resin, 50 parts of di-2-ethylhexyl phthalate and 1 part of stabilizer were made into a plastic sheet and subjected to heat aging by the procedures described above. These all show a high order of heat stability. Lower concentrations were also found effective.

Some of the plastics prepared with 3 parts of the stabilizers of this invention were also tested with regard to the staining of lead compound-stabilized plastics by the following procedure: A sample of the milled plastic sheet was clipped to a sheet of similar size made up from the following formulation:

100 parts polyvinyl chloride resin (Geon 101)
50 parts di-2-ethylhexyl phthalate
10 parts titanium dioxide pigment (Titanox A–LO)
2 parts basic lead carbonate
2 parts Dyphos (basic lead phosphite)
½ part DS–207 (dibasic lead stearate)

The two sheets held in contact by the clips were placed in a 4 ounce bottle which was then sealed and placed in a circulating air oven at 200° F. for 72 hours. Any staining of the white, lead stabilized sheet was then noted. The products of Example I–VIII, XIV, and others did not show any stain. Some of the products caused slight staining. The light stabilizing effectiveness of several of the products of this invention were studied by means of Fade-O-Meter tests carried out on polyvinyl chloride plastic sheets containing them. They were found to be good light stabilizers, superior to many commercial light stabilizers.

More specific results are defined in Table I wherein a mixture of chlorinated material, plasticizer and stabilizer was milled for five minutes on a two-roll differential speed mill at 320° F., being removed as a sheet. Portions of the sheet were cut into strips, 1" x 6". These strips were hung vertically and heat aged in a circulating air oven at 350° F. for 1 hour, with samples taken at fifteen minute intervals. Samples were rated visually, the degree of stability of the sheet being represented by the depth of colorations.

Table 1

| Stabilizer | Composition | Milled Sheet | ¼ hr. | ½ hr. | ¾ hr. | 1 hr. |
|---|---|---|---|---|---|---|
| none | same | | | | | R-B |
| 1.4 pts. Ex. 1 | 100 pts. Geon 101EP, 50 pts. DOP. | C | C | C | C | SY |
| 1.0 pt. Ex. 2 | ----do---- | C | C | C | VSY | SY |
| Do | 50 pts. Geon 101, 50 pts. DOP. | C | C | C | VSY | SY |
| Do | 50 pts. Geon 101EP, 35 pts. DOP, 15 pts. TCP. | C | C | VSY | SY | amber |
| 1.5 pts. Ex. 2 | 100 pts. VYNW-5, 50 pts. DOP. | C | C | VSY | SY | slt. ambr. |
| 2.0 pts. Ex. 2 | 100 pts. Exon 402-A (rigid). | SY | SY | SY | SY | Y |
| 1.0 pt. Ex. 3 | 100 pts. Geon 101, 50 pts. DOP. | C | C | C | VSY | SY |
| 1.0 pt. Ex. 4 | 100 pts. Geon 101EP, 50 pts. DOP. | C | C | C | Y | amber |
| 1.0 pt. Ex. 5 | 100 pts. Geon 101, 50 pts. DOP. | C | C | C | VSY | Y |
| 1.0 pt. Ex. 6 | ----do---- | C | C | C | C | SY |
| 1.0 pt. Ex. 7 | ----do---- | C | C | C | C | SY |
| Do | 100 pts. Geon 101, 35 pts. DOP, 15 pts. TCP. | C | C | C | SY | lt. ambr. |
| 1.0 pt. Ex. 8 | 100 pts. Geon 101, 50 pts. DOP. | C | C | C | C | SY |

DOP=dioctyl phthalate.
Geon 101EP=a polyvinyl chloride homopolymer made by B. F. Goodrich.
Geon 101=same.
TCP=tricresyl phosphate.
VYNW-5=a co-polymer of polyvinyl chloride and polyvinyl chloride-acetate made by Bakelite.
Exon 402-A=a polyvinyl chloride homo-polymer made by Firestone.
C=colorless; R-B=redbrown; SY=slightly yellow; VSY=very slightly yellow; Y=yellow.

This table clearly discloses the unusual stabilizing activity of these organotin derivatives in comparison to a chlorinated composition without such stabilizer.

Among the other uses of the organotin derivatives are their use as stabilizers for other chlorinated materials, as rubber accelerators, rubber anti-oxidants, lube oil additives, and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing a sulfur-containing organotin compound which comprises (1) esterifying B moles of a di-basic acid compound selected from the group consisting of di-basic acids of formula HOOCR'COOH and their anhydrides, with A moles of a hydroxy compound of formula ROH; (2) reacting the reaction product of (1) with C moles of an organotin oxide of formula R''$_2$SnO; (3) and reacting the reaction product of (2) with D moles of an ester of a mercapto substituted carboxylic acid, wherein the ester radical has the formula $$-\underset{\underset{O}{\|}}{C}-OR'''$$

in which R''' is selected from the class consisting of hydrocarbon radicals and ether linked hydrocarbon radicals, R and R'' are monovalent hydrocarbon radicals, R' is a divalent hydrocarbon radical, $$\frac{A}{B}$$

is within the range of ½ to 1;

$$\frac{D}{B}$$

is within the range of 0.2 to 2; and C has a value of between $$\frac{2B-A+D}{2} \text{ and } \frac{2B-A}{2}$$

2. A process according to claim 1, wherein the hydroxy compound is isooctyl alcohol, the organotin oxide is dibutyltin oxide, and the ester of a mercapto substituted carboxylic acid is isooctyl mercaptoacetate.

3. A method according to claim 1, wherein the ratio of $A:B:C:D=1:1:1:1$.

4. A method according to claim 1, wherein $$\frac{A}{B}=\frac{1}{2},\ C=\frac{2B-A}{2} \text{ and } \frac{D}{B}=\text{about } 0.9$$

5. A method according to claim 1, wherein $$\frac{A}{B}=\frac{3}{4},\ C=\frac{2B-A}{2} \text{ and } \frac{D}{B}=\text{about } 0.7$$

6. A method of preparing a sulfur-containing organotin stabilizer which comprises: esterifying B moles of a dibasic acid compound selected from the group consisting of dibasic acids of formula HOOCR'COOH and their anhydrides with A moles of a hydroxy compound at a temperature within the range of about 80°–130° C., to form a clear product, gradually adding to said clear product C moles of an organotin oxide of formula R''$_2$SnO; elevating the temperature of the mixture so formed to about 135° C., until the reaction mixture becomes clear, cooling this mixture to room temperature and adding thereto D moles of an ester of mercapto substituted carboxylic acid, wherein the ester radical has the formula $$-\underset{\underset{O}{\|}}{C}-OR'''$$

in which R''' is selected from the class consisting of hydrocarbon radicals and ether linked hydrocarbon radicals, R and R'' are monovalent hydrocarbon radicals, R' is a divalent hydrocarbon radical;

$$\frac{A}{B}$$

is within the range of ½ to 1;

$$\frac{D}{B}$$

is within the range of 0.2 to 2; and C has a value of between $$\frac{2B-A+D}{2}$$

and $$\frac{2B-A}{2}$$

7. A method according to claim 6 wherein the ratio of $A:B:C:D=1:1:1:1$.

8. A method according to claim 6 wherein $$\frac{A}{B}=\frac{1}{2},\ C=\frac{2B-A}{2}\ \text{and}\ \frac{D}{B}=\text{about } 0.9$$

9. A method according to claim 6 wherein $$\frac{A}{B}=\frac{2}{3},\ C=\frac{2B-A}{2}\ \text{and}\ \frac{D}{B}=\text{about } 0.7$$

10. As a composition of matter the reaction product of the process of claim 1.

11. As a composition of matter, the reaction product of the process of claim 2.

12. As a composition of matter the reaction product of the process of claim 3.

13. As a composition of matter the reaction product of the process of claim 4.

14. As a composition of matter the reaction product of the process of claim 5.

15. As a composition of matter the reaction product of the process of claim 6.

16. As a composition of matter the reaction product of the process of claim 7.

17. As a composition of matter the reaction product of the process of claim 8.

18. As a composition of matter the reaction product of the process of claim 9.

References Cited in the file of this patent

UNITED STATES PATENTS

| | | |
|---|---|---|
| 2,598,496 | Bradley et al. | May 27, 1952 |
| 2,604,483 | Mack | July 22, 1952 |
| 2,636,891 | Gregory | Apr. 28, 1953 |
| 2,680,107 | Leistner et al. | June 1, 1954 |